United States Patent [19]

Layne et al.

[11] Patent Number: 5,894,987
[45] Date of Patent: Apr. 20, 1999

[54] VARIABLE AREA INLET FOR VEHICLE THERMAL CONTROL

[75] Inventors: Thomas R. Layne, Niceville, Fla.; Milton E. Franke, Dayton, Ohio; Darrell B. Ridgely, Tucson, Ariz.

[73] Assignee: The United States of America as represented by the Secretary of the Air Force, Washington, D.C.

[21] Appl. No.: 08/863,636

[22] Filed: May 26, 1997

Related U.S. Application Data

[60] Provisional application No. 60/024,557, Aug. 26, 1996.

[51] Int. Cl.⁶ ............................... B60H 3/00; F28F 7/00
[52] U.S. Cl. ..................... 165/44; 62/259.2; 165/80.3
[58] Field of Search .............................. 236/49.3, 78.8; 62/259.2, 61; 165/80.3, 44; 454/184; 361/694

[56] References Cited

U.S. PATENT DOCUMENTS

| | | | |
|---|---|---|---|
| 2,167,472 | 7/1939 | Bedford | 236/49.3 |
| 2,956,585 | 10/1960 | Alsworth et al. | 454/184 X |
| 5,265,677 | 11/1993 | Schultz | 62/259.2 X |
| 5,481,433 | 1/1996 | Carter | 165/80.3 X |
| 5,523,563 | 6/1996 | Moessner | 62/259.2 X |
| 5,669,813 | 9/1997 | Jairazbhoy et al. | 454/69 |

*Primary Examiner*—William Wayner
*Attorney, Agent, or Firm*—Bobby D. Scearce; Thomas L. Kundert

[57] ABSTRACT

A variable area inlet structure for a vehicle utilizing ram air for coolant is described which comprises a variable area inlet device in the ram air inlet in the form of a butterfly valve, damper, shutter, or similar structure, a temperature sensor in thermal contact with a component within the vehicle to be cooled by ram air flow, a controller and actuator, responsive to the temperature sensor and operatively connected to the variable area device, for controlling the inlet area in response to the component temperature.

5 Claims, 1 Drawing Sheet

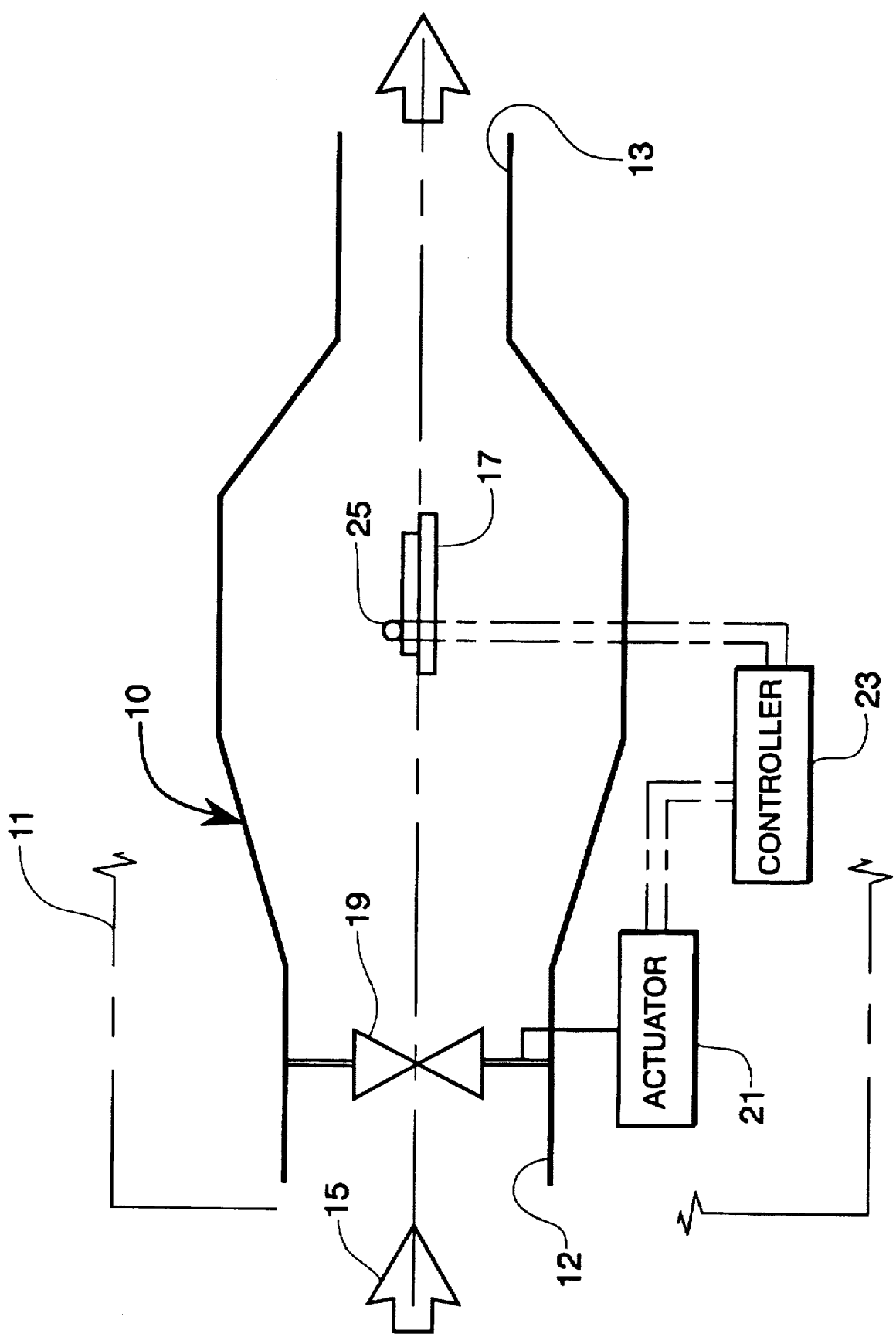

VARIABLE AREA INLET FOR VEHICLE THERMAL CONTROL

This application claims the benefit of Provisional Application Serial No. 60/024,557 filed Aug. 26, 1996.

RIGHTS OF THE GOVERNMENT

The invention described herein may be manufactured and used by or for the Government of the United States for all governmental purposes without the payment of any royalty.

BACKGROUND OF THE INVENTION

The present invention related generally to ram air inlet structures for providing coolant air to heat generating components within a vehicle, and more particularly to a variable area inlet structure for thermal control on heat generating components within a vehicle configured principally for reducing vehicle drag and thermal cycling of the components so cooled.

Aircraft, automobiles and other vehicle types use ambient air as a heat sink for cooling heat generating components within a vehicle. Most vehicles rely on ram air for forced convection cooling with fans to augment the ram air at low speeds. Currently, vehicles use fixed area inlets to conduct ram air into compartments containing heat generating components. A characteristic of fixed area inlet configurations is that the ducted air speed generally increases with vehicle speed and higher speeds generally improve the rate of convective heat transfer from the heat generating component to the ducted air. Low ducted air temperatures also improve the rate of heat transfer.

The combination of vehicle speed, ambient air temperature, and inlet characteristics present trade-offs for fixed area inlet configurations. However, fixed area inlets cannot be optimal for all vehicle speed and ambient temperature operating conditions. As a consequence, fixed area inlets are usually overdesigned in order to accommodate severe environmental conditions (i.e., northern winter air temperatures and southern summer air temperatures), which results in increased drag losses and reduced vehicle performance and efficiency. A substantial portion of the drag coefficient on an aircraft or an automobile may be attributable internal cooling air flow. Fixed area inlets may also cause undesirable thermal cycling of the cooled component.

The invention solves or substantially reduces in critical importance problems with conventional vehicle structures incorporating ram air cooling inlet structures as just suggested by providing a variable area inlet structure for thermal control on heat generating components within a vehicle comprising a variable area inlet device in the form of a butterfly valve, damper, shutter or similar structure, a temperature sensor in thermal contact with the heat generating component, and a programmable controller and an actuator in the form of a stepper motor or the like, responsive to signals from the temperature sensor, for controlling the area of the ram air inlet and, correspondingly, regulating the temperature of the component. The invention may be used in any vehicle using ram air coolant, such as aircraft, unmanned aerial vehicles, automobiles and other ground based vehicles and watercraft. Heat generating components which may be typically cooled include electronic equipment and engine parts.

It is therefore a principal object of the invention to provide a variable area inlet structure for conducting ram air coolant to a vehicle.

It is a further object of the invention to provide a variable area ram air inlet for a vehicle having minimum drag associated with the inlet.

It is another object of the invention to provide a variable area inlet for conducting ram air to a vehicle to minimize thermal cycling to the heat generating component within the vehicle.

It is a further object of the invention to provide a variable area ram air inlet for a vehicle for minimizing the inlet area over all vehicle speeds and ambient air temperatures while providing sufficient air for forced convective cooling to heat generating components within the vehicle.

It is another object of the invention to provide a variable area ram air inlet for a vehicle in order to optimize inlet air flow for diverse or variable velocity and environmental conditions.

These and other objects of the invention will become apparent as a detailed description of representative embodiments of the invention proceeds.

SUMMARY OF THE INVENTION

In accordance with the foregoing principles and objects of the invention, a variable area inlet structure for a vehicle utilizing ram air for coolant is described which comprises a variable area inlet device in the ram air inlet in the form of a butterfly valve, damper, shutter, or similar structure, a temperature sensor in thermal contact with a component within the vehicle to be cooled by ram air flow, a controller and actuator, responsive to the temperature sensor and operatively connected to the variable area device, for controlling the inlet area in response to the component temperature.

DESCRIPTION OF THE DRAWING

The invention will be more clearly understood from the following detailed description of representative embodiments thereof read in conjunction with the accompanying drawing which is a schematic view in axial section of a duct structure within a vehicle including a ram air inlet for providing coolant airflow to a heat generating component within the vehicle and illustrating the essential components of the invention incorporated into the duct structure.

DETAILED DESCRIPTION

Theoretical considerations and underlying principles of operation of the invention and test results on prototype systems built in demonstration of the invention are presented in the thesis, *Vehicle Thermal Control With A Variable Area Inlet*, T. R. Layne, AFIT/GAE/ENY/95D-15, Air Force Institute of Technology, Wright Patterson AFB OH, and in the paper, "Vehicle Thermal Control with a Variable Area Inlet," T. R. Layne et al, *Proceedings of the 1996 IEEE International Conference on Control Applications*, IEEE Cat No 96CH35854, Dearborn Mich. (Sep. 15–18, 1996) pp 775–780, and the paper "Thermal Control of Electronic Equipment by Variable-Area Inlet Air Cooling," T. R. Layne et al, to be presented at INTERpack '97 (Jun. 16, 1997), the entire teachings of which are incorporated herein by reference.

Referring now to the drawing, shown therein is a schematic view in axial section of a duct structure 10 within vehicle 11 having ram air inlet 12 and an exhaust or outlet 13 for providing coolant airflow 15 past a heat generating component 17 within vehicle 11. It may be noted at the outset that component 17 may comprise any heat generating component within vehicle 11 such as an electrical component, engine, or engine part, and duct structure 10 may comprise any housing enclosing the component and defining a duct having an inlet and outlet for passage of airflow 15.

In accordance with a governing principle of the invention a variable area device 19 is incorporated into inlet 12 of duct 10 for selectively metering airflow 15 of ram air through duct 10. Device 19 may be any suitable variable area device, such as a butterfly valve, damper, shutter, or other structure as would occur to the skilled artisan guided by these teachings. Device 19 is operatively connected to actuator 21 regulated by controller 23. Actuator 21 may comprise any suitable mechanism as would occur to the skilled artisan guided by these teachings, such as a stepper motor, through which the cross sectional area of inlet 12 may be selectively controlled or regulated, the specific actuating mechanism not considered limiting of the invention. Controller 23 may comprise any programmable device, such as a computer, the same also not considered limiting of the invention. A temperature sensor 25 in the form of a thermocouple, optical (infrared) sensor or other suitable sensor as might occur to the skilled artisan practicing the invention is disposed in thermal contact with component 17 to provide a signal to controller 23 corresponding to the temperature of component 17. Controller 23 provides a corresponding signal to actuator 21 to increase or decrease the flowthrough area of device 19 in accordance with a preselected and preprogrammed airflow 15 specification and ambient air and component 17 (sensor 25) temperatures in order to maintain component 17 at a preselected temperature level.

The invention therefore provides a variable area inlet structure for thermal control of heat generating components within a vehicle using ram air cooling. It is understood that modifications to the invention may be made as might occur to one with skill in the field of the invention within the scope of the appended claims. All embodiments contemplated hereunder which achieve the objects of the invention have therefore not been shown in complete detail. Other embodiments may be developed without departing from the spirit of the invention or from the scope of the appended claims.

We claim:

1. A variable area ram air inlet structure for a vehicle utilizing for coolant ram air induced by the speed of the vehicle, comprising:
    (a) a housing for enclosing a heat generating component in a vehicle, said housing defining a ram air inlet and an outlet and a duct between said inlet and said outlet for conducting coolant air flow past the heat generating component;
    (b) a variable area inlet device disposed within said duct near said ram air inlet for selectively restricting the cross sectional area of said duct near said inlet whereby the airflow through said duct is selectively metered;
    (c) a temperature sensor for thermally contacting the heat generating component and providing an output signal corresponding to the temperature of the heat generating component; and
    (d) an actuator, responsive to said output signal from said temperature sensor, and operatively connected to the variable area device, for selectively increasing and decreasing the cross sectional area of said duct near said ram air inlet in response to said output signal.

2. The structure of claim 1 wherein said variable area inlet device is a butterfly valve, a damper, or a shutter.

3. The structure of claim 1 wherein said actuator is a stepper motor.

4. The structure of claim 1 wherein said actuator includes a controller.

5. The structure of claim 1 wherein said temperature sensor is a thermocouple or an infrared optical sensor.

\* \* \* \* \*